United States Patent
De Wolf et al.

(10) Patent No.: US 10,486,084 B2
(45) Date of Patent: *Nov. 26, 2019

(54) COALESCENCE FILTER

(71) Applicant: ATLAS COPCO AIRPOWER, NAAMLOZE VENNOOTSCHAP, Wilrijk (BE)

(72) Inventors: Isabelle De Wolf, Wilrijk (BE); Evi Bultinck, Wilrijk (BE); Jo Wouters, Wilrijk (BE); Ken Goris, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 440 days.

This patent is subject to a terminal disclaimer.

(21) Appl. No.: 15/035,689

(22) PCT Filed: Nov. 27, 2014

(86) PCT No.: PCT/IB2014/066399
§ 371 (c)(1),
(2) Date: May 10, 2016

(87) PCT Pub. No.: WO2015/079409
PCT Pub. Date: Jun. 4, 2015

(65) Prior Publication Data
US 2016/0263509 A1    Sep. 15, 2016

Related U.S. Application Data

(60) Provisional application No. 61/909,431, filed on Nov. 27, 2013.

(30) Foreign Application Priority Data

Sep. 8, 2014 (BE) .................................. 2014/0669

(51) Int. Cl.
    *B01D 17/04* (2006.01)
    *C02F 1/40* (2006.01)
    (Continued)

(52) U.S. Cl.
    CPC ......... *B01D 17/045* (2013.01); *B01D 46/003* (2013.01); *B01D 46/0023* (2013.01);
    (Continued)

(58) Field of Classification Search
    None
    See application file for complete search history.

(56) References Cited

U.S. PATENT DOCUMENTS 4,124,360 A * 11/1978 Berger, Jr. ........... B01D 17/045
    210/315
4,144,040 A * 3/1979 Claes ................. B01D 39/2041
    55/466

(Continued)

FOREIGN PATENT DOCUMENTS

CN      1735448 A    2/2006
CN    102596862 A    7/2012
(Continued)

OTHER PUBLICATIONS

International Search Report (ISR) dated Apr. 1, 2015, for PCT/IB2014/066399.

*Primary Examiner* — Amber R Orlando
*Assistant Examiner* — Brit E. Anbacht
(74) *Attorney, Agent, or Firm* — Bacon & Thomas, PLLC

(57) ABSTRACT

The present invention relates to a filter unit for filtering a compressed gas contaminated with oil, in particular compressed air, wherein the filter unit contains a coalescence filter for coalescing the contaminant contained in the compressed gas, in particular oil. The coalescence filter comprises a housing with a gas supply for supplying the gas to (Continued)

a primary coalescence medium disposed in the housing, the gas flowing in a flow direction, wherein the primary coalescence medium contains at least one first layer of a first porous coalescence medium and a second layer of a second porous coalescence medium adjacent to the first layer, wherein the primary coalescence medium has a total thickness of at least 3.5 mm, measured at a pressure of 2 N/cm$^2$.

19 Claims, 3 Drawing Sheets

(51) Int. Cl.
| | |
|---|---|
| B01D 46/00 | (2006.01) |
| B01D 46/40 | (2006.01) |
| B01D 53/26 | (2006.01) |
| F04B 53/20 | (2006.01) |
| C02F 1/00 | (2006.01) |
| C10G 31/09 | (2006.01) |
| C02F 101/32 | (2006.01) |

(52) U.S. Cl.
CPC ......... *B01D 46/403* (2013.01); *B01D 53/265* (2013.01); *B01D 53/268* (2013.01); *C02F 1/001* (2013.01); *C02F 1/40* (2013.01); *C10G 31/09* (2013.01); *F04B 53/20* (2013.01); *B01D 2239/0421* (2013.01); *B01D 2239/0428* (2013.01); *B01D 2239/065* (2013.01); *B01D 2239/1216* (2013.01); *B01D 2239/1233* (2013.01); *B01D 2239/1258* (2013.01); *B01D 2239/1291* (2013.01); *C02F 2101/32* (2013.01); *C10G 2300/201* (2013.01)

(56) References Cited

U.S. PATENT DOCUMENTS

| 4,154,688 A | * | 5/1979 | Pall | ................ B01D 29/21 |
| | | | | 210/487 |
| 4,177,049 A | * | 12/1979 | Haslett, Jr. | ............ B01D 46/10 |
| | | | | 55/483 |
| 4,231,768 A | * | 11/1980 | Seibert | ...................... A61L 9/00 |
| | | | | 210/DIG. 5 |
| 4,911,872 A | * | 3/1990 | Hureau | .................. B65D 29/04 |
| | | | | 264/146 |
| 7,857,883 B2 | * | 12/2010 | Scheckel | ................ B01D 45/08 |
| | | | | 55/445 |
| 9,144,760 B2 | * | 9/2015 | Chase | ................ B01D 46/0031 |
| 9,149,748 B2 | * | 10/2015 | Nagy | ..................... B01D 39/18 |
| 9,199,185 B2 | | 12/2015 | Verdegan et al. | |
| 10,058,808 B2 | * | 8/2018 | Haberkamp | ......... B01D 39/163 |
| 2004/0050772 A1 | * | 3/2004 | Winter | ................. B01D 27/005 |
| | | | | 210/483 |
| 2004/0134171 A1 | * | 7/2004 | Scott | ................ B01D 46/0001 |
| | | | | 55/482 |
| 2006/0117727 A1 | * | 6/2006 | Siebels | ................ B01D 29/111 |
| | | | | 55/498 |
| 2006/0123744 A1 | | 6/2006 | Read | |
| 2007/0062887 A1 | * | 3/2007 | Schwandt | ........... B01D 17/045 |
| | | | | 210/799 |
| 2010/0146917 A1 | * | 6/2010 | Coulonvaux | ...... B01D 46/0005 |
| | | | | 55/344 |
| 2015/0101298 A1 | * | 4/2015 | Osendorf | .......... B01D 46/2414 |
| | | | | 55/502 |
| 2017/0128859 A1 | * | 5/2017 | Levitt | .................... B01D 29/23 |
| 2017/0252691 A1 | * | 9/2017 | Johnson | ............... B01D 46/002 |
| 2017/0266598 A1 | * | 9/2017 | Coulonvaux | ...... B01D 46/0005 |

FOREIGN PATENT DOCUMENTS

| EP | 1839728 B1 | 10/2011 |
| FR | 2573668 A1 | 5/1986 |
| RU | 2181068 C2 | 4/2002 |
| RU | 2261752 C1 | 10/2005 |
| RU | 2492915 C2 | 2/2011 |
| WO | 2011162854 A1 | 12/2011 |
| WO | 2013/083365 A1 | 6/2013 |

\* cited by examiner

COALESCENCE FILTER

BACKGROUND OF THE INVENTION

This invention relates to a filter unit for filtering a compressed gas contaminated with oil, in particular compressed air, wherein the filter unit contains a coalescence filter for coalescing the contaminant contained in the compressed gas, in particular oil, according to the preamble of the first claim.

Many of today's systems and processes employ compressed gases, especially compressed air, for a variety of purposes, including automation, for inducing a displacement or a movement etc. In typical applications where there is a direct contact with compressed air, such as in the finishing of automobile parts, respiration of human beings, food packaging etc., it is desirable that compressed air is used with a purity which is as high as possible.

Filtering of the gas intake by a compressor, in particular air, is mainly provided to minimize the concentration of the contamination present therein and to reduce wear of the compressor at the position of the suction inlet. Thus, atmospheric air may contain 0.05-0.5 mg/m$^3$ of unburned oil particles.

Filtering of the compressed gas emanating from the compressor, in particular compressed air, mainly envisages the removal of solid particulate matter, water and oil. Oil is mainly present in the form of oil droplets, aerosol and vapor, water is mainly present in the form of water vapor, aerosol, droplets and as a liquid acid concentrate, solid particles may, for example be microorganisms, dust and rust particles. Contamination of compressed air may therefore inter alia be attributed to contamination already present in the intake air, but also to evaporation of the oil and wear in the course of compression when using oil-lubricated air compressors. Numerous air compressors namely use oil in the compression stage, for sealing and lubrication purposes and as a coolant. Oil transfer during compression is typically less than 5 mg/m$^3$, due to the efficiency of the compressors in modern integrated air/oil separators.

Modern compressor installations contain in addition to a compressor, one or more filters and dryers for the purification of the compressed air. The ISO8573-1:2010 air quality standard was developed as a standard method for measuring and representing the purity of air at different positions in a compressor. In order to allow oil removal to a sufficiently low concentration, compressed air is typically subjected to a filtration in several successive steps. For the removal of oil aerosol, and oil vapor from compressed air, use is usually made of a group of two or more consecutive coalescence filters, in particular a pre-filter for removing the bulk of the oil aerosol, followed by a high efficiency coalescence filter which removes the residual oil aerosol up to the envisaged level. In addition to oil aerosol, coalescence filters may also remove very small solid particles, for example particles up to 0.01 micron. Each coalescence filter is positioned in its own housing. To ensure optimum purification, the coalescence filter is generally preceded by a water separator and an activated carbon filter for removing oil vapor. In the course of time assembly kits have been developed, which enable easy mounting of a series of successive filters.

Omitting the removal or reduction of the concentration of the contamination can bring along problems in the installation that makes use of the compressed air, and cause damage or blockage of valves, cylinders, air motors, devices that make use of air, manufacturing plants, and can cause undesirable product contamination. In addition to these problems with the compressed air system itself, the release of particulates, oil and microorganisms may lead to an unhealthy and unsafe environment, Use of contaminated compressed air often leads to inefficient production processes, product waste, reduced production efficiency and increasing production costs.

U.S. Pat. No. 4,124,360 describes a filter apparatus comprising a pre-filter for coalescing the majority of the oil contained in the compressed air supplied by the compressor, and a coalescence medium for coalescing the residual oil present in the air which originates from the pre-filter. The coalescence filter is arranged concentrically with respect to the pre-filter, with a layer of air between the two filters. The coalesced oil which originates from the pre-filter is intermittently removed. It is believed that by carrying out the coalescence in two steps, in particular a coarse filtration followed by a fine filtering, and by intermittently discharging the coalesced oil, a better purification of the compressed air may be obtained. In order to achieve the desired purity, it is of use that the compressed air is filtered by two successive coalescence filters, wherein the first filter is intended to reduce the amount of oil to about 0.1 mg/m$^3$, while the subsequent second filter is intended to further reduce the amount of present in the compressed air to 0.01 mg/m$^3$.

The known filter device which makes use of two consecutive coalescence filters presents the disadvantage that the coalescence filters occupy a relatively large space.

Consequently, there is a need for a compressed air filter unit for an air compressor, which is more compact than those used up to now, without this going at the expense of the purity of the compressed air.

SUMMARY OF THE INVENTION

This is achieved according to the invention with a filter unit showing the technical characteristics of the first claim.

Thereto, the filter unit of the present invention is characterized in that the coalescence filter comprises a housing with a gas supply for supplying the gas to a primary coalescence medium disposed in the housing, the gas flowing in a flow direction, wherein the primary coalescence medium contains at least one first layer of a first porous coalescence medium and a second layer of a second porous coalescence medium adjacent to the first layer, wherein the primary coalescence medium has a total thickness of at least 3.5 mm, preferably at least 4 mm, preferably at least 5 mm, more preferably at least 6 mm, most preferably at least 7 mm, in particular at least 7.5 mm measured at a pressure of 2 N/cm$^2$.

In the context of this invention, the first and second coalescence medium may be the same or different.

Within the scope of this invention the wording "total thickness" means that the thickness of the primary coalescence medium is measured in the direction in which the gas flows through the coalescence filter and thus through the coalescence medium, while the primary coalescence medium is subjected to an ambient pressure of 2 N/cm$^2$.

Within the scope of this invention the wording "adjacent" means that the first and second porous coalescence medium are arranged relative to each other in such a way that they contact each other, in particular that the surface of the first coalescence medium contacts an abutting contact surface of the second coalescence medium. In such an adjacent positioning no or only a minimum air layer is present between the first and second coalescence medium.

The inventors have surprisingly found that in spite of the much larger total layer thickness of the coalescence medium, by combining two or more coalescence media to a single primary coalescence medium that is placed in one housing, the overall pressure drop across the coalescence filter can be significantly reduced compared to the prior of the art, where mostly two or more coalescence filters are placed in series in their own housing. The inventors have also found that the purified compressed air which exits the coalescence filter, shows a high purity as intended, and that the purity is not adversely affected despite the fact that no drainage of coalesced oil occurs between successive coalescence filters. On the contrary, the purity of the compressed air exiting the coalescence filter turns out to be even better than that achieved with two consecutive coalescence filters, which may or may not be placed in a separate housing and in which intermediate drainage is provided. This is surprising.

The observed reduced pressure drop across the filter unit is attributed by the inventors to a combination of factors, which support and reinforce each other.

A first reduction in the pressure drop is attributed to a reduction of the housing pressure drop. The inventors have found that since all the coalescence media are combined in one housing, the pressure drop due to the housing occurs only once. On the other hand, in the state of the art filter unit which contains two or more coalescence filters which are each located in their own housing, a pressure drop across each housing of each coalescence filter is observed.

A second pressure drop reduction is attributed to the adjacent positioning of successive coalescence media, which entails a reduction of the capillary pressure associated with the coalescence medium. The inventors have observed that the capillary pressure to be overcome by the coalesced oil upon leaving the first coalescence medium and entering the next adjacent coalescence medium, may substantially be reduced by the adjacent positioning of the subsequent coalescence media and the absence of an air layer between the two media. The capillary pressure is defined as the pressure which must be overcome by a coalescing liquid when flowing into the pores of a non-wetting, for example, an oil-repellent coalescence medium, as well as the pressure which must be overcome when leaving a wetting, for example, oil-adsorbing coalescence medium. This pressure reduction is particularly pronounced when the primary coalescence medium is exclusively made of wetting or non-wetting material.

The inventors have furthermore found that also the channel pressure, this is the resistance which must be overcome by the oil during its movement through the primary coalescence medium, is limited and is small in comparison with the capillary pressure. This is surprising since it is of use in the prior art to limit or reduce the layer thickness of the coalescence medium in order to increase the filter performance, for example by applying a limited number of layers of porous material to keep the channel pressure and the pressure drop across the filter layer associated therewith, low.

The present invention now makes it possible to not only improve the filter efficiency and to provide a filtered compressed gas with a higher purity, in particular compressed air, but also to reduce the pressure drop across the coalescence filter, and thus to improve the filter performance and to reduce energy consumption for purifying the compressed gas considerably.

For the sake of practicality in existing filter-devices and from a cost point of view, the primary coalescence medium preferably has a total thickness of maximum 50 mm, preferably maximum 40 mm, more preferably maximum 30 mm, most preferably maximum 25 mm, especially maximum 20 mm. The inventors have in fact found that the filtering efficiency is not significantly improved with a higher thickness of the primary coalescence medium and that the material cost is likely to become disproportionately high. With a further increasing thickness moreover a risk exists that the channel pressure raises too high. It has namely been particularly found that once coalescence of the contaminant into larger drops has taken place, transport through the coalescence medium is carried out under the influence of the transport of the gas through the coalescence medium. It has thereby been observed that the pressure to be overcome to permit transport of the coalesced drops, in particular, oil drops, through the primary coalescence medium, depends on the thickness of the coalescence medium.

The inventors have also found that within the indicated thickness of the coalescence medium, the coalescence yield, i.e. the ratio of the amount of contaminant in particular oil, which is filtered by the primary coalescence medium or coalesced in the primary coalescence medium, relative to the amount of contaminant at the inlet of the compressed air filter, is not adversely affected. In particular, it has been found that the purity of the compressed gas leaving the filter, is similar to or even better than the purity of compressed gas which had been subjected to a purification by means of the prior art filters, where a first filtration step is carried out for achieving a first purity, and then a second filtration for the further purification to a better level, and wherein intermediate drainage of the coalesced oil that had been coalesced in the first filtration step takes place.

In a first embodiment of this invention, the primary coalescence medium is made up of a plurality of layers of a material that is wetting for the contaminant to be coalesced, or a material that is non-wetting. The primary coalescence medium is preferably composed of a plurality of layers of an oleophilic or oleophobic porous filter medium.

By stacking layers of a filter medium of substantially the same nature, ie, wetting or non-wetting, it is possible to prevent that an additional capillary pressure has to be overcome when the coalesced oil enters a next layer when coming from a previous layer, and it is therefore possible to minimize the risk that the pressure drop across the coalescence filter would raise as a result of material transitions.

Successive layers of coalescence medium with wetting properties may be the same or different, i.e., successive layers may be more or less wetting, have the same density or different, have the same air permeability or a different, fibers of substantially the same dimensions and/or the same physical properties or different, etc. Similarly, successive layers of a coalescence medium with a non-wetting properties may be the same or different, i.e. successive layers may be more or less wetting, have the same density or have a different one, have the same air permeability or a different one, fibers in substantially the same dimensions and/or the same physical properties or different, etc.

The inventors have found that an arrangement of the coalescence media as described above enables achieving an optimal reduction of the pressure drop across the coalescence filter. The adjacent positioning of successive coalescence media makes it possible to minimise the pressure drop caused by the capillary pressure: the film that is being moved out of the wetting coalescence medium and into the non-wetting coalescence medium, must be formed only once and not twice as is the case with coalescence filters located in separate housings. Since all of the successive layers are either wetting or non-wetting, there is no need for the coalescing liquid to overcome capillary pressure at the exit of the first coalescence medium and when entering the second coalescence medium. In addition, the pressure drop that has to be attributed to the channel pressure is considerably lower than the pressure drop due to the capillary pressure and the pressure drop caused by the housing.

The first coalescence medium may be a layered material, which is composed of one layer of the same medium, or of a plurality of adjacent layers of the same or different media. Similarly, the second coalescence medium may be a layered material, which is composed of one layer of the same medium or of a plurality of adjacent layers of the same or different media.

In a second embodiment of this invention, the primary coalescence medium is composed of a first layer consisting of at least one layer of a coalescence medium that is wetting for the contamination to be coalesced positioned upstream with respect to the gas supply, and at least one second layer of a coalescence medium that is non-wetting for the contaminant to be coalesced and is positioned downstream with respect to the gas supply. This arrangement permits to achieve a comparable purity as compared with a primary coalescence medium that is made up exclusively of a wettable or a non-wetting medium, while using a smaller number of layers of coalescence medium. It is assumed that the film of coalesced liquid which is moved out of the oleophilic medium, and flows into the oleophobic medium, needs to be built once only and not twice as would be the case with two filter media accommodated in separate housings or positioned at a distance from each other.

Preferably, the primary coalescence medium comprises at a position upstream with respect to the gas supply a plurality of layers of an oleophilic coalescence medium, and at a position downstream with respect to the gas supply a plurality of layers of an oleophobic coalescence medium.

The material used to manufacture the first and second coalescence medium is preferably a porous material having pores with an average diameter between 2 and 100 micron, preferably between 3 and 70 micron, more preferably between 5 and 50 micron, in the particularly between 5 and 35 micron, more particularly between 5 and 30 micron. The average pore diameter was determined using microscopy. The first and second coalescence medium may be built from the same porous material, i.e. with the same average pore diameter, or pores with a different average diameter. The use of a porous material having large pores permits to further lower the pressure channel.

The material used for the manufacture of the first and second coalescence medium is usually a fibrous material that mainly contains fibers having an average diameter of 0.25-20 micron, preferably 0.5-10 micron, although fibers with an even smaller or larger diameter, may be present. Usually, the first and second coalescence medium will be composed of a plurality of fibers of which the diameter varies within the aforesaid limits. Thereby, the first and second coalescence medium may be built of fibers having the same or a different average diameter.

The primary coalescence medium of this invention preferably has an air permeability of at least 30 $l/m^2 \cdot s$, preferably at least 50 $l/m^2 \cdot s$, more preferably at least 60 $l/m^2 \cdot s$, most preferably at least 80 $l/m^2 \cdot s$, in particular at least 100 $l/m^2 \cdot s$ or more. The air permeability can vary within wide limits and in practice will typically not be higher than 2,000 $l/m^2 \cdot s$, preferably 1,750 $l/m^2 \cdot s$ at a maximum. The air permeability is measured at 2 mbar according to DIN EN ISO 9237. In addition, the air permeability of the coalescence medium first may be the same or different from that of the second coalescence medium. The inventors have found that with increasing air permeability, the channel pressure may further be reduced.

The first and second coalescence medium of this invention can be simply manufactured, for instance, by processing a fibrous material, for instance glass fibers, in such a way that a layer-form or sheet-form material is provided having pores or openings between the fibers. The pores in the fibrous material of the coalescence medium through which the fluid moves and in which coalescence takes place are substantially formed by the spaces that are present between the fibers of the fibrous material. Suitable techniques that make this possible are known to the skilled person and comprise inter aha manufacturing one or more sheets, for instance, woven or nonwoven fibrous materials, knitted materials, braided fibers, films, scrims, and combinations of the aforementioned materials or laminates or composites thereof. Fibrous materials suitable for use in a primary coalescence medium of this invention are known to the skilled person, and are preferably so chosen as to be able to effect the capture and coalescence of the contaminant in the coalescence medium. However, other porous materials may also be suitably used as primary coalescence medium.

The skilled person is able to adapt the total thickness of the primary coalescence medium taking account of its nature, in particular taking into account the average size of the pores and/or the air permeability and/or density, in order to attain the envisaged performance.

The first layer of the primary coalescence medium may be made up of one single layer or a plurality of closely stacked or closely wrapped adjacent layers of a sheet-form porous filter material. With closely stacked is meant that successive layers are in contact with each other or, in other words, that successive layers are arranged adjacently. Adjacent layers of sheet-form coalescence medium are preferably stacked such, or a sheet of the coalescence medium is wrapped such that successive layers of the coalescence medium are arranged adjacently, that the distance between successive layers is minimal, and that any layer of air present between successive layers has a minimal thickness or, preferably, is even absent. This permits to keep the capillary pressure that is to be overcome upon displacement of the fluid from one layer to the other, to be kept as low as possible. This also makes it possible to minimize the risk of the fluid flowing out between successive layers. By analogy, the second layer of the primary coalescence medium may be made up of one single layer or a plurality of closely stacked or closely wrapped adjacent layers of a sheet-form porous filter material. The number of layers of which the first layer of the coalescence medium is built may be the same as or different from the number of layers of which the second coalescence medium is built.

Both in the first layer of the primary coalescence medium as in the second layer, the layer thickness of the individual layers vary within wide limits. For example, the layer thickness of the individual layers of the first layer of the primary coalescence medium can vary from 0.1 to 1 mm, preferably 0.4 mm, more preferably 0.5 mm, most preferably 0.6 mm. The skilled person is able to choose the desired layer thickness taking account of the coalescence medium for the intended total thickness. The thickness of the individual layers in the first coalescence medium may be the same as in the second or different coalescence medium. The layer thickness of the first medium from which the coalescence medium is constructed may be the same as or different from the layer thickness from which the second coalescence medium is made up.

The primary coalescence medium of this invention includes preferably at least 4 successive layers of a same porous material to guarantee a sufficient degree of coalescence, more preferably at least 6 layers, most preferably at least 10 layers. The number of layers will generally not be more than 30, since the filter efficiency is not significantly improved if the primary coalescence medium includes more layers, and the material cost then tends to become disproportionally high. A further increase of the number of layers moreover entails a risk of the channel pressure becoming too high, as has been explained hereinabove. Preferably, the number of layers of material from which the primary coalescence medium is built up is not more than 25, most preferably not more than 20.

The first coalescence medium can have the same total thickness as the second or any other coalescence medium.

a preferred embodiment of this invention, the primary coalescence medium has a density in the range of from 0.05 to 0.90 g/cm$^3$, preferably from 0.05 to 0.75 g/cm$^3$, more preferably from 0.08 to 0.50 g/cm$^3$. The density is measured by weighing an amount of material of the primary coalescence medium having an area of 1 m$^2$, and multiplying this by the thickness of this material, measured with a digital micrometer at a pressure of 2 N/cm$^2$.

In a preferred embodiment of this invention, the primary coalescence medium has an over-all density in the range of 0.05 to 0.90 g/cm$^3$, preferably 0.05 to 0.75 g/cm$^3$, more preferably from 0.08 to 0.50 g/cm$^3$. Materials having a density of between 0.10 to 0.25 g/cm$^3$ or 0.12 to 0.17 g/cm$^3$ may also be suitable and be preferred for use with specific fluids and/or impurities. The density of the first layer of the first coalescence medium and the second layer of the second coalescence medium may be the same or different. The density is measured by weighing a quantity of material of the primary coalescence medium having a surface area of 1 m$^2$, and multiplying this by the thickness of this material, as measured with a digital micrometer at a pressure of 2 N/cm$^2$.

BRIEF DESCRIPTION OF THE DRAWINGS

The invention is further explained below in the attached figures and description of these figures.

FIG. 3a shows the pressure drop measured over a conventional filter system, with a first housing in which a first coalescence filter is made of an oleophilic filter material, and a second housing in which a second coalescence filter is made of an oleophobic filter material.

FIG. 3b shows the pressure drop measured over a coalescentiefiler of this invention, with a first filter coalescence medium made of an oleophilic material, and a second coalescence medium made of an oleophobic filter material.

FIG. 3c shows the pressure drop measured over a coalescentiefiler of this invention, with one type of coalescence medium.

DETAILED DESCRIPTION OF THE INVENTION

Figure 1:
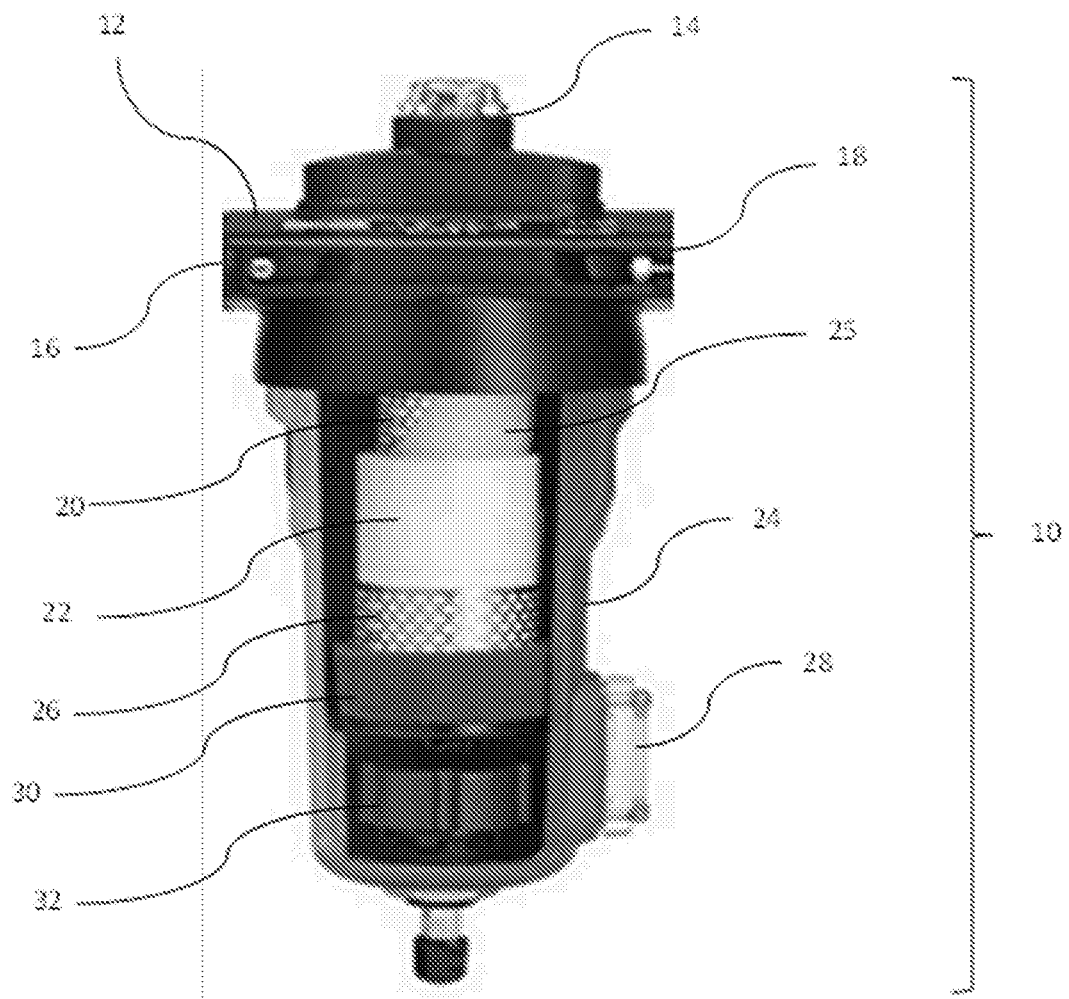
FIG. 1 shows a view of the inner volume of a representative coalescence filter for the purification of compressed gas.
Figure 2:
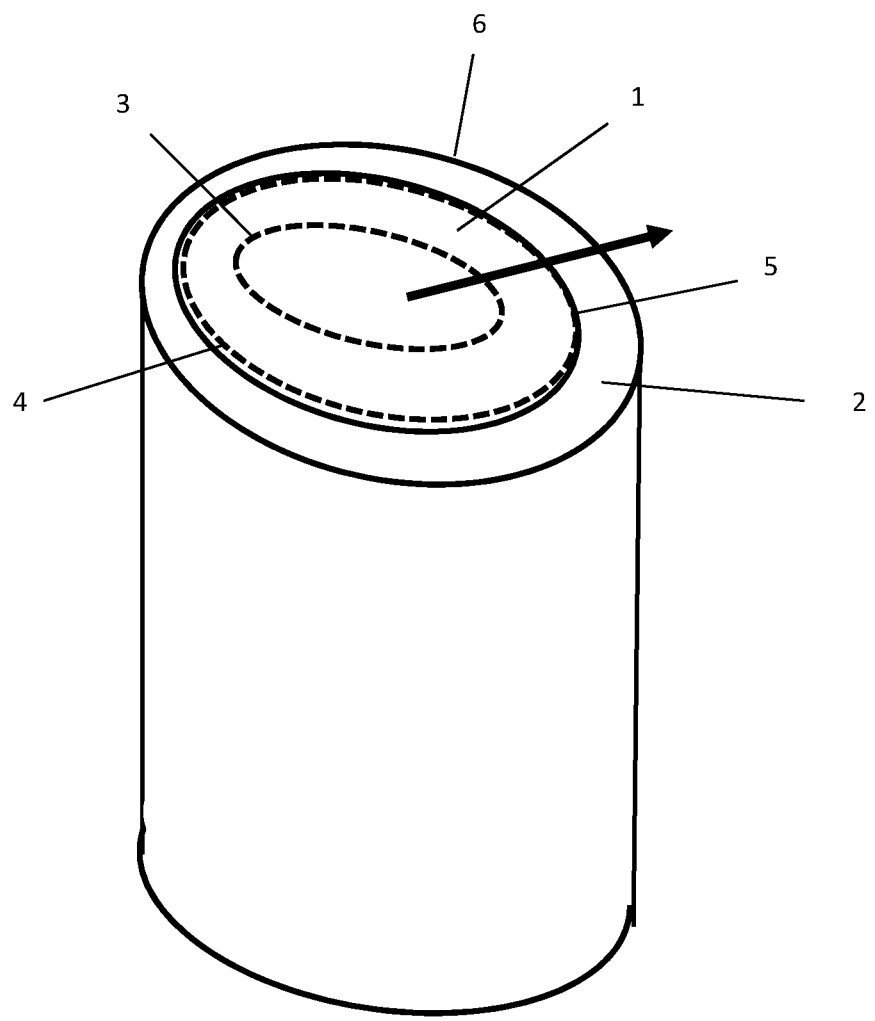
FIG. 2 shows a schematic view of a coalescence filter of this invention.

The filter unit of this invention contains a coalescence filter 10 as shown in FIGS. 1 and 2. The coalescence filter 10 includes a closed housing 24 with a filter head 12 at the top. Filter head 12 includes an inlet 16 through which a fluid comprising a support and at least one contaminant is introduced into the coalescence filter, for example, a gas with an contaminant, in particular air or compressed air contaminated with oil. The housing 24 contains an outlet 18 for discharging a fluid and/or carrier liquid, which has moved through the coalescence filter 22, for example compressed air. Filter head 12 is removably connected to housing 24, so that the interior of the coalescence filter 10 is accessible for the replacement of the coalescence medium 22, if necessary. The releasable connection may be established in any manner considered suitable by the skilled person, for example by means of a screw connection, by means of pressure, friction, clamps etc. Inlet 16 is connected to the interior of the coalescence filter 10 in such a manner that a fluid, for example a compressed gas, may be fed to the coalescence medium 22, The coalescence medium 22 is preferably releasably connected with the filter head 12, so that the coalescence medium 22 may be replaced periodically, or can be replaced if necessary.

The coalescence medium 22 includes a primary coalescence medium. As shown in FIG. 2 the primary coalescence medium contains at least a first layer 1 of a first porous coalescence medium, and a second layer 2 of a second porous coalescence medium positioned adjacent to the first layer. The gas to be purified flows in the direction of the arrow, i.e., from and through the first coalescence medium 1 to and through the second coalescence medium 2. The first coalescence medium 1 has a surface 3 situated upstream relative to the gas supply or air supply and a surface 4 situated downstream with respect to the compressed air supply which forms the contact surface with the second coalescence medium 2. The second coalescence medium 2 has an upstream surface 5 which forms the contact surface with the first coalescence medium 1 and a downstream surface 6.

If so desired, the primary coalescence medium may further contain additional layers of one or more porous coalescence media, for example, a third and/or fourth layer or a further additional layers. The choice of the number of layers and the nature of the material for these layers can be tailored by the skilled person taking into account the removal of contaminant, and the concentration thereof.

The primary coalescence medium 10 preferably has a total thickness of at least 3.5 mm, preferably at least 4 mm, preferably at least 5 mm, more preferably at least 6 mm, most preferably at least 7 mm, in particular at least 7.5 mm measured at a pressure of 2 N/cm$^2$. The thickness of the primary coalescence medium will usually not exceed 50 mm, preferably up to 40 mm, more preferably up to 30 mm, most preferably up to 25 mm, in particular at most 20 mm.

The coalescence filter shown in FIG. 1 is intended for coalescence one or more liquid contaminants present in a carrier of a fluid. The one or more contaminants may for example be an inert or reactive substance. The one or more contaminants may, for example, belong to the group of liquids, aerosols, drops or macro-mixtures of two or more of these materials. An example of a fluidum suitable for use with the coalescence filter of this invention is compressed air contaminated with an oil aerosol.

Suitable materials for use as a primary coalescence medium, in particular suitable for use as the first layer of the first coalescence medium and as a second layer of the second coalescence medium, include sheet-shaped or layer-shaped substrates or materials composed of fibers having a finite length, continuous filaments, and combinations thereof. The primary coalescence medium preferably contains suitable materials that can withstand the pressure exerted in order to permit displacement of the fluid through the primary coalescence medium, against the liquid contaminants present in the fluid and the static and dynamic load to which the material is subjected during the manufacture of the filter, the assembling thereof and the use thereof. Examples of suitable layer-shaped fibrous materials include woven or non-woven fibrous materials, knitted fabrics, mesh, film, and combinations of the above materials or laminates or composites thereof.

The primary coalescence medium is preferably a multi-layered material, which preferably includes at least 4 layers, more preferably at least 6 layers, most preferably at least 10 layers. Mostly, the number of layers of fibrous material will not be higher than 20. The thickness of the individual layers of the coalescence medium is not critical for this invention and may vary within wide limits. The thickness of a layer can be, for instance, a thickness of 0.4 mm, 0.5 mm, 0.6 mm, 0.75 mm or 1 mm. On the other hand, the primary coalescence medium may also be made up of one layer of the desired material, in the desired thickness.

In a first embodiment of this invention, the primary coalescence medium is made up of a plurality of layers of a material that is wetting for the contaminant to be coalesced, or non-wetting. The primary coalescence medium is preferably composed of a plurality of layers of an oleophilic or oleophobic porous filter medium. Successive layers of coalescence medium with wetting properties may be the same or different, successive layers may be more or less wetting, have the same density or different, have the same air permeability or a different, fibers substantially have the same dimensions and/or different physical properties or different, etc. In the same way, successive layers of a coalescence medium with non-wetting properties may be the same or different, i.e. successive layers may be more or less wetting, have the same or a different density, the same air permeability or a different one, fibers of substantially the same dimensions and/or the same or different physical properties, etc. The number of layers of material in the first coalescence medium may be the same as or different from the number of layers of material in the second coalescence medium.

In another embodiment of this invention, the layer of the first coalescence medium built of a coalescence medium that wetting is for the coalescing contaminant, and is the layer of the second coalescence medium built from a material that is non-wetting for the coalescing contaminant. The first layer of the coalescence medium may be built of one single layer, or of a plurality of layers of material that is wetting for the contaminant to be coalesced. The second coalescence medium may be comprised of one single layer, or of a plurality of layers of material which is non-wetting for the contaminant to be coalesced. The number of layers of material in the first coalescence medium may be the same as or different from the number of layers of material in the second coalescence medium.

Examples of fibrous materials that are particularly suitable for manufacturing a layered material for use in the primary coalescence medium of this invention comprise thermoplastic materials, thermosetting materials, organic or inorganic materials, metallic materials or alloys, admixtures, blends and chemically modified materials, for instance manufactured by drawing, spinning, needling, hydroentanglement, melt spinning (for instance, spin bonding, nanofibers, melt blowing), wet-laying, electro-spinning, solvent spinning, point bonding, adhesive bonding, continuous weave/knit, casting, co-extrusion, etc. Materials of particular preference comprise glass fibers, silicate-based wet-laid thermosetting adhesive bond nonwoven fabrics, for instance, a borosilicate glass fiber of finite length, because of their thermal and hydrothermal resistance to loading by the fluid, the carrier liquid and the contaminant, without the need of chemical modification, for instance by a fluorocarbon surface treatment.

A multi-layered primary coalescence medium can be produced in different ways, for instance, by stacking, pleating, rolling or wrapping a plurality of layers of a fibrous material, so that the desired number of layers is obtained. However, any other method can be suitably used. The layers of the fibrous material are preferably arranged adjacently relative to each other, such that a layer of air of a least possible layer thickness is present between adjacent layers. Preferably, adjacent layers are so arranged that no layer of air is present between them. This can be obtained, for instance, by pressing a plurality of stacked layers together or clamping them, for instance along one or more sides of the fibrous material. Preferably, however, the fibrous material is wrapped, to keep the risk of damage minimal.

Adjacent to a surface of the primary coalescence medium 22 positioned downstream in relation to the air supply, a drainage layer 30 may be provided, preferably along a downstream surface of the primary coalescence medium through which coalesced contamination leaves the primary coalescence medium, for receiving and discharging of coalesced contaminants and promoting their discharge. This downstream positioned drainage layer 30 is also intended to provide a barrier which counteracts back flow of coalesced contaminants to the coalescence medium, and/or, in particular, to the carrier of the fluid. Without being bound to this hypothesis it is assumed that the drainage layer forms an interface or transition zone along the interface of the primary coalescence medium along which drainage occurs, as a result of which accumulation of the contaminant: along the interface or transition layer is counteracted, by the formation of large droplets which are driven by the driving force of gravitation and which settle in the filter housing prior to being discharged from the filter. If so desired, also upstream of the primary coalescence medium a protective layer can be arranged, adjacent to a surface of the primary coalescence medium through which fluid is supplied to the primary coalescence medium, in such a way that both materials contact each other. Downstream of the coalescence filter also a protective layer can be added adjacent to a surface of the primary coalescence medium, which except to a protective effect may also have an additional drainage function.

Materials for use in the drainage layer 30 can be, for instance, woven or nonwoven materials, knitted materials, films, open cell foams, cast or spun scrims, open meshes and combinations of laminates or composites of the aforementioned materials. Materials for use in the drainage layer 30 may be chosen, for instance, from the group of thermoplastic or thermosetting plastics, organic or inorganic substances, metallic materials or alloys, blends of the aforementioned materials and chemically modified forms thereof. The aforementioned materials can be manufactured in any manner considered suitable by the skilled person, for instance by drawing, spinning, needling, hydroentanglement, melt spinning (for instance, spin bonding, nanofibers, melt blowing), wet-laying, electro-spinning, solvent spinning, point bonding, through-air bonding, adhesive bonding, continuous weave/knit, casting, coextrusion, expansion, solvent cast and the like. Particularly preferred are polyurethane foams, since they are well resistant, to thermal loading by the fluid and/or the carrier and contaminant liquid present in the fluid, but at the same time counteract return of the contaminants, for instance hydrocarbon-based contaminants, to the coalescence medium, without the necessity of pretreating one or more parts of the coalescence filter or the drainage layer with fluorine-containing substances.

The primary coalescence medium 22, the drainage layer 30 and the barrier layer can be assembled in the coalescence filter 10 as separate layer-form materials. It is also possible, however, to unite the aforementioned materials in a laminate, so that they form a whole, and optimum contact between adjacent layers is ensured and optimum flow of fluid from one layer to the next can take place.

If desired, upstream but also downstream of the primary coalescence medium 22, a protective layer 25 may be provided. This protective layer 25 can also serve as a drainage layer, or direct the fluid flow in a desired direction. An example of a suitable material for use as a protective layer 25 is an open polypropylene layer, but other materials can also be used. Preferably, the filter element also includes a core 20. The at least one primary coalescence medium 22 is arranged downstream of the filter core 20.

The coalescence filter 10 preferably includes one or more internal support structures 26, which support integration of the filter element into one mechanical whole, which minimize the risk of mechanical deformation of the filter materials including the coalescence medium 22, under the influence of loading by the fluid, and protect same against the action of unexpected or momentary impact.

Downstream of the coalescence medium 22 in the direction of the discharge, further a layer of a filter material may be provided which is capable of adsorbing oil vapors and vapors of other hydrocarbons, for example, a layer of activated carbon.

Upstream with respect to the coalescence medium 22, for example, a particle filter may be provided for the removal of solid particles.

The housing 24 may further include a drainage mechanism 32. A suitable drainage mechanism 32 may include automatic, semi-automatic or manually controlled valves, along which a contaminant which has been coalesced and retained and drained in the housing, may be removed.

The coalescence filter 10 can further include optional components, which further improve the use and the yield of the filter. Filter head 12 can include, for instance, a status indicator 14, which gives an indication about the status of the coalescence filter, including the potential necessity for a periodic replacement. The status indicator 14 may be provided for directly or indirectly measuring the yield of the coalescence filter and may include an indicator providing indicia of the condition of the coalescence filter 10, by means of, for instance, a visual, auditory or electronic signal or a combination thereof. The indicator 14 may work pneumatically or electrically or according to any principle considered suitable by the skilled person.

The invention further relates to a filter unit for the filtering of compressed gas, in particular a compressed air filter unit, which contains a coalescence filter as described above, and which further comprises a filter for removing water. The filter for removing water may be any filter known to the skilled person, for example, a refrigerant dryer, a dryer provided with a drying agent, a membrane dryer, or a combination of two or more of them. The compressed air filter unit may also contain a filter to remove solid particles.

The invention also relates to a coalescence filter as described above, as part of a filter unit as described above.

The invention further relates to a compressor for the compression of one or more gases, wherein the compressor is provided with an outlet for releasing one or more compressed gases, wherein the outlet is connected to a filter unit as described above for purification of the one or more gases. The invention relates in particular to an air compressor provided with an outlet for releasing compressed air, wherein the outlet is connected to a filter unit as described above.

In a particular embodiment, the compressor is built into a housing, and the housing further includes a coalescence filter as described above, and one or more filters fib the removal of water, water vapor and water aerosol as described above. Preferably, the filter unit as described above and the water filter built into a separate housing, so that they are removed together in the separate housing and can be replaced.

The invention also relates to a primary coalescence medium 22, as described above, as part of a compressed air filter unit 10 as described above.

Figure 3:
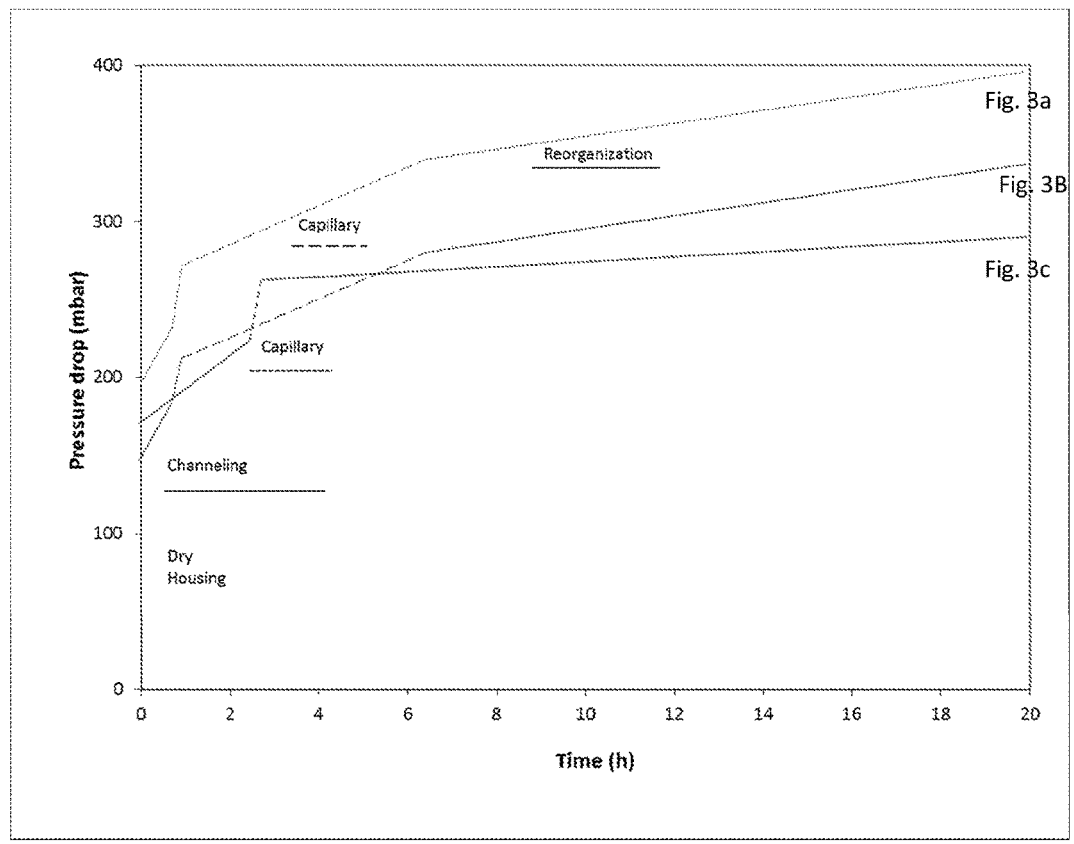
FIG. 3 shows the pressure drop measured over a coalescence filter.

FIG. 3, in particular FIG. 3a, shows the pressure drop measured over a conventional filter system, with a first housing comprising a first coalescence filter made of an oleophilic filter material, and a second housing with a second coalescence filter made of an oleophobic filter material. Approximately half of the total pressure drop across both coalescence filters is due to the pressure drop caused by housing by the first and second housing. The oil contaminant present in the compressed air easily penetrates the oleophilic material in at the surface located upstream with respect to the supply, and moves easily through the oleophilic material. Upon reaching the surface located downstream with respect to the supply, capillary forces will tend to keep the oil in the filter material, so that a capillary pressure must be able to be built up before the coalesced oil will be capable of leaving the filter material. On entering the second filter the oil in the compressed air has to overcome a capillary pressure to penetrate the oleophobic filter material. Finally, the oil is moved through the oleophilic and the oleophobic filter medium and reorganization may take place.

FIG. 3b shows the pressure drop measured over a compressed air filter unit according to the invention, wherein the primary coalescence medium contains a plurality of layers of an oleophilic material upstream with respect to the air inlet, and a plurality of layers of an oleophobic material downstream with respect to the air supply. The number of layers is the same as in FIG. 3. Because only one housing is provided, the pressure drop caused by the housing is almost halved when compared to the situation of FIG. 3. The dry pressure drop caused by the filter material remains the same as in FIG. 3, since also two filters are present. The pressure drop due to the channel pressure is the same as in FIG. 3, since the same number of layers are present. However, the pressure drop due to the capillary pressure is considerably lower: the film which is pushed out of the oleophilic medium, into the oleophobic medium, needs only be formed once and not twice as in the case in FIG. 3.

FIG. 3c shows the pressure drop measured across a compressed air filter unit according to the invention, wherein the primary coalescence medium comprises a plurality of layers of an oleophilic material. The number of layers is higher than in FIGS. 3a and 3b. Because only one single housing is present, the pressure drop caused by the housing is almost halved compared with the situation in FIG. 3. The dry pressure drop caused by the filter material is higher as in FIGS. 3a and 3b because of the higher number of layers of filter medium. Also, to the pressure drop due to the channel pressure is somewhat higher as in FIGS. 3a and 3b due to the larger number of layers.

The invention is further elucidated with reference to the examples below.

The fibrous materials described below were tested as a coalescence filter for the purification of oil-polluted air, as described in ISO 125004, and ISO 8573-2. The initial oil concentration in the air was 10 mg/m$^3$.

COMPARATIVE EXPERIMENTS A-B

Compressed air with an oil concentration of 10 mg/m$^3$ was passed through a pre-filter containing 6 layers of an oleophilic material. The air which had been purified by pre-filter was then passed through a second coalescence filter, containing 6 layers of an oleophobic material. The compressed air that left the filter contained 0.001 mg/m$^3$ of oil.

The total pressure drop across the pre-filter and the coalescence filter was 400 mbar.

Example 1

Compressed air with an oil concentration of 10 mg/m$^3$ was sent through one single coalescence filter, made up of 15 layers of an oleophilic material, which are cylindrically wound in such a way that successive layers are adjacently positioned. The pressure drop across the filter was 250 mbar. The compressed air that left the filter contained 0.001 mg/m$^3$ of oil.

Example 2

Compressed air with an oil concentration or 10 mg/m$^3$ was controlled by only one coalescence filter, made up of six layers of an oleophilic material, which are cylindrically wound in such a way that successive layers are adjacently positioned, followed by 6 layers of an oleophobic material which are also wound in such a way that successive cylindrical layers adjacent are positioned. The pressure drop across the filter was 330 mbar. The compressed air that has left the filter contained 0.001 mg/m$^3$ of oil.

From the comparison of Examples 1 and 2 with Comparative Experiment A shows that the pressure drop across the housing may considerably be reduced by omitting one housing.

Furthermore, it appears that the pressure drop across a coalescence filter with a larger layer thickness is less than the pressure drop formed when compressed air is guided over a successive pre-filter and coalescence filter as is shown by comparative experiment A.

The invention claimed is:

1. A filter unit for filtering a compressed gas contaminated with oil, wherein the filter unit comprises a coalescence filter for coalescing the contaminant contained in the compressed gas,
wherein the coalescence filter comprises a housing with a gas supply for supplying the gas to a primary coalescence medium disposed in the housing, the gas flowing in a flow direction,
wherein the primary coalescence medium comprises at least one first layer of a first porous coalescence medium and a second layer of a second porous coalescence medium wrapped around and adjacent to the first layer,
wherein the primary coalescence medium has a total thickness of at least 3.5 mm measured at a pressure of 2 N/cm$^2$,
wherein the primary coalescence medium has an air permeability of at least 100 l/m$^2$·s, and
wherein pores of the primary coalescence medium and the second porous coalescence medium have the same average pore diameter of between 5 and 30 µm wherein the primary coalescence medium has a density of between 0.05 and 0.90 g/cm$^3$.

2. The filter unit according to claim 1, wherein the primary coalescence medium has a thickness of maximum 50 mm.

3. The filter unit according to claim 1, wherein the primary coalescence medium is made of a plurality of layers of a material that is wetting for the contaminant which is to be coalesced, or of a plurality of layers of a material that is non-wetting for the contaminant to be coalesced.

4. The filter unit according to claim 3, wherein the primary coalescence medium is made up of a plurality of layers of an oleophilic or oleophobic material.

5. The filter unit according to claim 1, wherein the primary coalescence medium contains, at a position upstream with respect to the gas supply, a plurality of layers of a material which is wetting for the compound to be coalesced and at a downstream position, a plurality of layers of a material which is non-wetting for the compound to be coalesced.

6. The filter unit according to claim 5, wherein the primary coalescence medium contains, at a position upstream with respect to the gas supply, a plurality of layers of an oleophilic material, and downstream of the gas supply a plurality of layers of an oleophobic material.

7. The filter unit according to claim 1, wherein the gas is compressed air.

8. The filter unit according to claim 1, wherein the contaminant is oil.

9. The filter unit according to claim 1, wherein the primary coalescence medium has an air permeability of maximum 2000 l/m$^2$·s.

10. The filter unit according to claim 1, wherein the coalescence filter contains at a position adjacent to a surface of the primary coalescence medium, along a surface of the primary coalescence medium positioned downstream with respect to the gas supply, through which the coalesced contaminant leaves the primary coalescence medium, a layer of drainage material, for receiving and draining of coalesced contaminant.

11. The filter unit according to claim 1, wherein in the coalescence filter downstream of the coalescence medium, one or more layers are provided of a filter material for removing oil vapor.

12. The filter unit according to claim 1 which further comprises a water filter for removing water.

13. The filter unit according to claim 12, wherein the filter for removing water is a refrigerant dryer, a dryer provided with a drying agent, a membrane dryer, or a combination of two or more hereof.

14. The filter unit according to claim 1 which further comprises a filter for removing solid particles.

15. A compressor for compressing one or more gases, wherein the compressor is provided with an outlet for releasing the one or more gases, wherein the outlet is connected to a filter unit according to claim 1 for the purification of the one or more gases.

16. A coalescence filter for coalescing the contaminant contained in the compressed gas comprising a housing with a gas supply for supplying the gas to a primary coalescence medium disposed in the housing, the gas flowing in a flow direction, wherein the primary coalescence medium contains at least one first layer of a first porous coalescence medium and a second layer of a second porous coalescence medium wrapped around and adjacent to the first layer, wherein the primary coalescence medium has a total thickness of at least 3.5 mm at a pressure of 2 N/cm$^2$, as a part of a filter unit, and wherein the primary coalescence medium has an air permeability of at least 100 l/m$^2$·s, and wherein pores of the primary coalescence medium and the second porous coalescence medium have the same average pore diameter of between 5 and 30 μm wherein the primary coalescence medium has a density of between 0.05 and 0.90 g/cm$^3$.

17. The filter unit according to claim 1, wherein the primary coalescence medium has a density of between 0.12 and 0.17 g/cm$^3$.

18. The filter unit according to claim 1, wherein the compressed gas is air, and wherein the primary coalescence medium has a total thickness of at least 5 mm.

19. The filter unit according to claim 18, wherein the primary coalescence medium has a density of between 0.12 and 0.17 g/cm$^3$, and wherein the primary coalescence medium has a total thickness of at least 7.5 mm.

* * * * *